United States Patent [19]

Stacy et al.

[11] 4,278,585

[45] Jul. 14, 1981

[54] RUBBER COMPOSITIONS

[75] Inventors: Carl J. Stacy; Rector P. Louthan, both of Bartlesville, Okla.

[73] Assignee: Phillips Petroleum Company, Bartlesville, Okla.

[21] Appl. No.: 62,390

[22] Filed: Jul. 31, 1979

[51] Int. Cl.$^3$ .............................................. C08K 9/06
[52] U.S. Cl. ............................ 260/42.15; 260/42.37; 260/746; 260/765; 260/766; 556/427; 556/428
[58] Field of Search ................... 260/42.15, 42.37, 746, 260/765, 766; 556/427, 428

[56] References Cited

U.S. PATENT DOCUMENTS

| | | | |
|---|---|---|---|
| 3,170,940 | 2/1965 | Johnston | 556/427 |
| 3,362,978 | 1/1968 | Kanner | 556/427 |
| 3,798,196 | 3/1974 | Rocktaschel et al. | 260/42.15 |
| 3,873,489 | 3/1975 | Thurn et al. | 260/33.6 AQ |
| 3,947,436 | 3/1976 | Rocktaschel et al. | 260/42.15 |
| 3,957,718 | 5/1976 | Pockert et al. | 260/38 |

*Primary Examiner*—Lewis T. Jacobs

[57] ABSTRACT

This invention relates to novel sulfur-containing organosilicon compounds comprising substituted dithiocarbamates and substituted sulfenate esters and the use of these novel compounds as reinforcing promoters for silica-filled rubber compositions.

16 Claims, No Drawings

RUBBER COMPOSITIONS

This invention relates to novel sulfur-containing organosilicon compounds and the use of these compounds as reinforcing promoters for rubber compositions. In accordance with another aspect, this invention relates to novel substituted dithiocarbamates. In accordance with another aspect, this invention relates to novel substituted sulfenate esters. In accordance with a further aspect, this invention relates to the use of the instant novel sulfur-containing organosilicon compounds as reinforcing promoters for silica-filled rubber compositions. In accordance with a further aspect, this invention relates to silica-containing vulcanizable rubber compositions containing novel sulfur-containing organosilicon compounds as reinforcing promoters. In still another aspect, this invention relates to products obtained by curing silica-containing vulcanizable rubber compositions having the instant novel sulfur-containing organosilicon compounds as reinforcing promoters.

BACKGROUND OF THE INVENTION

Carbon black has historically been the reinforcing agent of choice for rubber-based products such as tires and extruded and molded goods. Carbon black, which is produced by the thermal decomposition of oil and natural gases, greatly enhances mechanical strength and resistance to abrasion, and has in the past been an economically attractive approach to improving the physical properties of rubber products. However, the increasing demand for other oil or gas-derived petrochemicals combined with the decreasing supply of oil and natural gas has prompted searches for a carbon black replacement.

Reinforcing silica's higher cost and poorer performance has previously prevented it from competing with carbon black as a reinforcing filler for rubber. However, with recent and projected oil and gas price increases, and with the development of new silica manufacturing processes, amorphous and fine particle-size silicas have become available which are considered to be economically competitive with carbon black. A major effort to make reinforcing silica competitive with carbon black on a performance basis has evolved as a result of these changing economical factors. One approach is the incorporation into the rubber recipe of reinforcing promoters, or coupling agents, to effectively bond the silica to the rubber.

Accordingly, an object of this invention is to provide novel compositions.

Another object of this invention is to provide novel rubber reinforcing promoters.

A further object of this invention is to provide improved vulcanizable silica-containing rubber compositions.

A further object of this invention is to provide reinforcing promoters that will effectively bond the reinforcing materials to rubber.

Other objects, aspects, as well as the several advantages of the invention, will be apparent to those skilled in the art upon reading the specification and the appended claims.

SUMMARY OF THE INVENTION

Broadly, the present invention comprises novel sulfur-containing organosilicon compounds which can be used to significantly enhance the effectiveness of siliceous materials used as reinforcing fillers for rubber products.

More specifically, in accordance with the invention, vulcanizable rubber compositions are provided comprising a curable rubber polymer, a silica-based filler, and an organosulfur reinforcing promoter which aids in effectively bonding the silica-based filler to the rubber upon curing the rubber composition.

In accordance with another embodiment of the invention, novel substituted silylhydrocarbylsulfenyl dithiocarbamates are provided which novel compounds can be used as reinforcing promoters in silica-filled rubber compositions.

In accordance with a further specific embodiment, novel substituted silylhydrocarbylsulfenates are provided which compounds can be used as reinforcing promoters in silica-filled rubber compositions.

Specific novel compounds according to the invention include 3-(trimethoxysilyl)propysulfenyl dimethyldithiocarbamate, methyl 3-(trimethoxysilyl)propylsulfenate and ethyl 3-(trimethoxysilyl)propylsulfenate.

The substituted silylhydrocarbylsulfenyl dithiocarbamates of this invention are represented by the formula

wherein R is hydrogen, alkyl, cycloalkyl, aryl, or combinations thereof, the hydrocarbyl radicals having 1 to about 10 carbon atoms; R' is alkyl, cycloalkyl, aryl, or combinations thereof, having 1 to about 10 carbon atoms; R'' and R''' can be the same or different and are hydrogen, alkyl, aryl, or combinations thereof, or alternately R'' and R''' can be linked together and form with the nitrogen atom a cyclic structure; Q is alkylene, cycloalkylene, arylene, or combinations thereof, having 1 to about 10 carbon atoms; and n is 0, 1, or 2. 3-(Trimethoxysilyl)propylsulfenyl dimethyldithiocarbamate is representative of compounds of this structure.

The substituted silylhydrocarbylsulfenyl dithiocarbamates can be prepared by allowing a (mercaptoalkyl)-trihydrocarbyloxysilane, exemplified by (3-mercaptopropyl)-trimethoxysilane, to react with a chlorinating agent, such as sulfuryl chloride, and the resulting (trihydrocarbyloxysilyl)hydrocarbylsulfenyl chloride allowed to react with the product resulting from the reaction of carbon disulfide and a dihydrocarbyl or cyclic secondary amine (such as dimethylamine) to produce the desired substituted silylhydrocarbylsulfenyl dithiocarbamate. The reaction can be carried out at ambient conditions while maintaining the reaction mixture under a suitable inert atmosphere such as nitrogen.

The substituted silylhydrocarbylsulfenate esters of this invention are represented by the formula

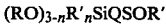

wherein R, R', Q and n are as described previously. Methyl 3-(trimethoxysilyl)propylsulfenate and ethyl 3-(trimethoxysilyl)propylsulfenate are representative of compounds of this structure.

The substituted silyhydrocarbylsulfenate esters can be prepared by allowing a (mercaptoalkyl)trihydrocarbyloxysilane, such as (3-mercaptopropyl)trimethoxysilane, to react with a chlorinating agent, such as sulfuryl chloride, and the resulting (trihydrocarbyloxysilyl) hydrocarbylsulfenyl chloride allowed to react with an alcohol, such as ethanol, to produce the desired substituted silylhydrocarbylsulfenate ester. The reaction can be carried out at ambient conditions while maintaining the reaction mixture under a suitable inert atmosphere such as nitrogen.

The amount of reinforcing promoter used in this invention is a reinforcing promoting amount sufficient to effectively bond the silica-containing reinforcing material to the rubber. Generally, this amount will be within the broad rang of about 0.05 to about 10 phr (parts by weight of reinforcing promoter per hundred parts of rubber), with a preferred range of about 0.1 to about 3 phr.

The rubber component of this invention can be of any type although it is preferred that the rubber be subject to a sulfur type vulcanization and as such should have some degree of unsaturation. Typical rubbers useful in this invention include natural rubber, homopolymers or copolymers of conjugated dienes, copolymers of conjugated dienes and monovinylarenes which would include emulsion and solution polymerized rubbers, terpolymers of ethylene, propylene, and a non-conjugated diolefin, butyl rubber, and nitrile rubber. The polymers can be linear or branched. The conjugated dienes suitable are those which ordinarily contain 4 to about 12 carbon atoms per molecule, with those containing 4 to about 8 carbon atoms being preferred, and are exemplified by such as 1,3-butadiene, isoprene, piperylene, 2,3-dimethyl-1,3-butadiene, 3-butyl-1,3-octadiene, 2-phenyl-1,3-butadiene, and the like. The monovinylarenes suitable are those which ordinarily contain 8 to about 16 carbon atoms per molecule, and are exemplified by styrene, α-methylstyrene, 3-methylstyrene, 4-n-propylstyrene, 4-p-tolystyrene, 1-vinylnaphthalene, and the like.

The reinforcing fillers suitable for use in this invention include any type of silica-containing material which is considered to have reinforcing properties. These are often described as siliceous fillers and refer to fillers which are rubber compatible or can be worked into rubber mixtures, said fillers consisting of silicates or silica, or contain silicates or silica and/or contain chemically bound silicates (or silica) in the widest sense, including mixtures of two or more siliceous fillers.

Suitable siliceous fillers include:

(1) Highly dispersed silica (silicon dioxide) having a specified surface area in the range of about 5 to 1000, preferably 20 to 400 m$^2$/g (determined with gaseous nitrogen according to the known BET procedure) and with primary particle sizes in the range of about 5 to 500 nm. (nanometer, $10^{-9}$ meters), which can be produced, for example, by precipitation from solutions of silicates, by hydrolysis and/or oxidative high temperatures conversion. There can also be used flame hydrolysis of volatile silicon halides, e.g., silicon tetrachloride, or electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (e.g., zirconium dioxide), or titanium (e.g., titanium dioxide).

(2) Synthetic silicates, for example, aluminum silicate or alkaline earth silicates such as magnesium, or calcium silicate with specific surface areas of about 20 to about 400 m$^2$/g and primary particle sizes of about 10 to about 400 nm.

(3) Natural silicates, for example, kaolin, wollastonite, talc and asbestos as well as natural silicas, e.g., quartz or sand.

Typical commercially available and suitable examples of silica for use in this invention includes Hi Sil 233 ® (PPG Industries), Ultrasil ® and Aerosil ® (Degussa) and Cabosil ® (Cabot Corp). Generally, precipitated grade silica is the preferred filler due to favorable cost.

The siliceous fillers can be added in an amount sufficient to reinforce the rubbery polymer and provide a final rubber product of desirable properties. Generally, the amount of filler will range from about 5 to about 150 parts by weight per hundred parts by weight of rubber.

Appropriate compounding ingredients which are well known in the rubber industry can also be employed in the rubbery composition of this invention. These include accelerators, vulcanizing agents such as sulfur and sulfur-yielding compounds, antioxidants, antiozonants, light stabilizers, other fillers, processing aids, and the like.

Industrial fields of use for the described rubber mixtures include, for example, industrial rubber articles such as cable insulation, hoses, driving belts, V-belts, conveyor belts, roller coating, vehicle tire treads, tire carcasses, tire sidewalls, cross-country tires, shoe sole materials, packing rings, damping elements, and many others.

The rubbery composition formulation used in this invention is considered to be conventional and thus not critical to the successful operation of the invention. The formulation used for evaluation is shown in Recipe I.

RECIPE I

Formulations Used for Reinforcing Promoter Evaluation

| Ingredient | Parts by Weight |
|---|---|
| SBR 1500[a] | 100 |
| Silica[b] | 40 |
| Zinc oxide | 4 |
| Stearic acid | 2 |
| Sulfur | 2.75 |
| Benzothiazyl disulfide[c] | 1.5 |
| Diphenyl guanidine[d] | 1.5 |
| Reinforcing promoter | 0 or 1.5 |

[a]Butadiene/styrene emulsion polymerized copolymer having a bound monomer ratio of 76.5/23.5
[b]A precipitated hydrated silica having 22 nm particle size sold as Hi Sil 233 (PPG Industries).
[c]A cure accelerator sold as Altax (R. T. Vanderbilt).
[d]A cure accelerator sold as DPG.

Variations in the quality of the ingredients or the substitution of other type ingredients is left to the discretion of those skilled in the art. In like manner, the method of mixing of the ingredients, accomplished in any suitable mixer, and the method for curing or vulcanizing of the formulation is left to the needs and experience of those skilled in the art.

The following examples serve to illustrate the preparation of the reinforcing promoters of the instant invention and their usefulness as reinforcing promoters in silica-filled, sulfur vulcanized rubber compositions.

EXAMPLE I

This example illustrates the preparation of 3-(trimethoxysilyl)propylsulfenyl dimethyldithiocarbamate.

(3-Mercaptopropyl)trimethoxysilane (196 g; 1 mole) and n-heptane (2000 ml) were charged to a dry three-necked, 3-1 round-bottomed flask equipped with a mechanical stirrer, a dry-ice condenser, and an additional funnel. Sulfuryl chloride (135 g; 1 mole) was added dropwise from the addition funnel to the stirred heptane solution of (3-mercaptopropyl)-trimethoxysilane while maintaining the reaction mixture at ambient temperature under a nitrogen atmosphere.

To a second, similarly equipped reaction flask was charged dimethylamine (90 g; 2 moles) and methanol (100 ml). Carbon disulfide (80 g; 1.05 moles) was added dropwise from the additional funnel to the stirred mixture of dimethylamine and methanol at ambient temperature while maintaining the reaction mixture under a nitrogen atmosphere, and the mixture stirred for about 30 minutes after the addition was complete. The contents of the first reaction flask were then transferred under nitrogen into the second reaction flask containing the reaction product (dimethylamine salt of dimethyldithiocarbamate) derived from carbon disulfide and dimethylamine, and this combined mixture allowed to stir at ambient temperature under a nitrogen atmosphere for about one hour. A portion of the solvent was removed from the reaction mixture by heating to about 94°-98° C. under a nitrogen atmosphere at atmospheric pressure. The concentrated reaction mixture was filtered and the residual solvent removed under reduced pressure. The product was again filtered to remove residual solid impurity leaving about 272 g of a liquid product which was shown by analysis to contain 27.9 weight percent sulfur and 3.6 weight percent nitrogen. Theoretical weight percent sulfur and weight percent nitrogen for 3-(trimethoxysilyl)-propylsulfenyl dimethyldithiocarbamate is 30.5 and 4.4, respectively.

EXAMPLE II

This experiment was intended to produce O-ethyl-S-[3-(trimethoxysilyl)propylsulfenyl] xanthante. However, the product isolated was identified by analysis to be ethyl 3-(trimethoxysilyl)propylsulfenate and was thought to have resulted from the splitting out of carbon disulfide from the apparently unstable desired xanthate.

(3-Mercaptopropyl)trimethoxysilane (196 g; 1 mole) and n-heptane (2000 ml) were charged to a dry three-necked, 3-1 round bottomed flask equipped with a mechanical stirrer, a dry-ice condenser, and an addition funnel. Sulfuryl chloride (135 g; 1 mole) was added dropwise from the addition funnel to the stirred heptane solution of (3-mercaptopropyl)-trimethoxysilane while maintaining the reaction mixture at ambient temperature under a nitrogen atmosphere.

To a second, similarly equipped reaction flask was charged triethylamine (101 g; 1 mole) and ethanol (200 ml). Carbon disulfide (80 g; 1 mole) was added dropwise from the addition funnel to the stirred mixture of triethylamine and ethanol at ambient temperature while maintaining the reaction mixture under a nitrogen atmosphere, and the mixture stirred for about 35 minutes after the addition was complete. The contents of the first reaction flask were then transferred under nitrogen into the second reaction flask containing the reaction product derived from carbon disulfide, triethylamine, and ethanol, and this combined reaction mixture allowed to stir at ambient temperature for about thirty minutes. Ethanol was distilled from the reaction mixture, the residual solution cooled to room temperature, 500 ml of n-heptane added, and the resulting solution filtered. The filtrate was concentrated at reduced pressure, and the concentrate refiltered to yield about 228 g of transparent yellow liquid which was shown by analysis to contain 14.1 weight percent sulfur. Theoretical sulfur content of the desired O-ethyl-S-[3-(trimethoxysilyl)-propylsulfenyl]xanthate is 30.4 weight percent, whereas the theoretical sulfur content of ethyl 3-(trimethoxysilyl)-propylsulfenate, which could arise from the splitting out of carbon disulfide from the unstable xanthate, is 13.3 weight percent. It is believed on the basis of this analysis that the product isolated from this reaction is ethyl 3-(trimethoxysilyl)propylsulfenate.

EXAMPLE III

This example illustrates the preparation of methyl 3-(trimethoxysilyl)propylsulfenate.

(3-Mercaptopropyl)trimethoxysilane (196 g; 1 mole) and n-pentane (2000 ml) were charged to a dry three-necked, 3-1 round-bottomed flask equipped with a mechanical stirrer, a dry-ice condenser, and an addition funnel. Sulfuryl chloride (135 g; 1 mole) was added dropwise from the addition funnel to the stirred pentane solution (3-mercaptopropyl)trimethoxysilane while maintaining the reaction mixture under a nitrogen atmosphere. Stirring was continued for an additional 20 minutes after the addition was complete. A mixture of triethylamine (111 g; 1.1 moles) and methanol (250 ml) was added slowly to the stirred reaction mixture from the addition funnel and stirring continued for an additional 30 minutes after the addition was complete. The reaction mixture was filtered and the reaction flask and the residual triethylamine hydrochloride washed with methanol (500 ml). Upon concentrating the filtrate by heating on a steam bath under a continuous flow of nitrogen, a small amount of solid separated from solution. n-Pentane (1000 ml) was added and the resulting mixture refiltered. The filtrate was then stripped of solvent on a steam bath while maintaining the solution under a continuous flow of nitrogen, leaving about 177 g of a transparent yellow liquid which was shown by analysis to contain 14.9 weight percent sulfur. Theoretical weight percent sulfur for methyl 3-(trimethoxysilyl)propylsulfenate is 14.2 weight percent.

It is believed that ethyl (3-trimethoxysilylpropyl)-sulfenate which was the isolated product in Example II, could be prepared by the procedure of Example III by substituting ethanol for the methanol.

EXAMPLE IV

This example illustrates the usefulness of methyl and ethyl 3-(trimethoxysilyl)propylsulfenate, and 3-(trimethoxysilyl)propylsulfenyl dimethyldithiocarbamate as reinforcing promoters for silica-filled rubber.

The sulfenyl dithiocarbamate and the two sulfenate esters of Example I, II, and III were compounded with SBR-1500 emulsion polymerized butadiene/styrene copolymer in the formulation shown previously in Recipe I. A control compounded blend without added reinforcing promotor and a comparative run containing a commercial promoter were also prepared. Compounds were mixed on a 5.08 cm (2 inch) laboratory rubber mill using the following milling schedule:

| Operation | Time, minutes |
| --- | --- |
| Breakdown | 2 |
| Filler addition | 5 |
| Promoter addition | 2 |
| Curatives addition | 2 |

-continued

| Operation | Time, minutes |
|---|---|
| Cut and fold | 2 |
| Fold and tightpass | 3 |
| Remill | 3 |

Compounded stocks were vulcanized for 30 minutes at 160° C. Physical properties of the rubber stocks are shown in Table I.

TABLE I

Physical Properties of Rubber Stocks Having Sulfur-Containing Reinforcing Promoters

| Run No. | Promoter[a] | 300% Modulus[b], MPa | Tensile Strength[b], MPa | $\Delta T^c$, °C. | Resilience[d], % | Scorch Time[e], Minutes |
|---|---|---|---|---|---|---|
| 1[f] | None | 4.8, 5.3 | 20.3, 19.4 | 33.6, 33.0 | 55.2, 68.0 | 12.7, 10.1 |
| 2 | A | 14.7 | 18.7 | 24.1 | 73.0 | 6.9 |
| 3[f] | B | 11.0, 12.0 | 21.9, 21.9 | 26.0, 25.6 | 70.9, 70.8 | 13.4, 11.6 |
| 4 | C | 11.8 | 17.4 | 25.8 | 69.7 | 10.1 |
| 5 | D | 13.4 | 19.3 | 25.3 | 71.8 | 9.9 |

[a]A = 3-(trimethoxysilyl)propylsulfenyl dimethyldithiocarbamate
B = Methyl 3-(trimethoxysilyl)propylsulfenate
C = Ethyl 3-(trimethoxysilyl)propylsulfenate
D = Bis[3-(triethoxysilyl)propyl] tetrasulfide; commercial promoter Si 69, DeGussa, Inc.
[b]ASTM D412-75
[c]ASTM D623-67
[d]ASTM D945-72
[e]ASTM D1646-74. Time in minutes required for a rise of 5 Mooney viscosity points above the minimum Mooney viscosity for a non-cured stock being maintained at 140° C.
[f]Duplicate runs were made. Values for both runs are recorded.

These data illustrate the improvement in modulus, the reduction in heat build-up ($\Delta T$), and the higher resilience of the cured rubber stocks containing the sulfur-containing reinforcing promoters of this invention compared to control Run No. 1 without promoter. Furthermore, these data illustrate that the sulfur-containing reinforcing promoters of the instant invention are comparable to the commercial promotor Si 69 (Run No. 5).

We claim:

1. A silica-containing vulcanizable composition comprising:
    (a) a vulcanizable natural or synthetic rubber;
    (b) a siliceous filler; and
    (c) at least one sulfur-containing organosilicon compound of the formulas

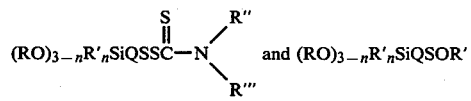 and $(RO)_{3-n}R'_nSiQSOR'$ wherein R' is a hydrocarbon radical of 1 to 10, inclusive, carbon atoms, R, R" and R''' are selected from R' and hydrogen, R" and R''' can be linked together and form with the nitrogen atom a cyclic structure, Q is alkylene, cycloalkylene, arylene, or combinations thereof having from 1 to about 10, inclusive, carbon atoms, and n is 0, 1, or 2, said organosilicon compound increasing the bonding of said siliceous filler to said rubber.

2. The product obtained by curing the composition of claim 1.

3. A composition according to claim 1 wherein (a) is a polymer of a conjugated diene.

4. A composition according to claim 1 wherein (a) is a sulfur curable polymer and the composition includes sulfur or a sulfur yielding material.

5. A cured product of claim 4.

6. A composition according to claim 1 including sulfur, a cure accelerator, processing aids and light and ozone stabilizers.

7. A composition according to claim 1 wherein based upon 100 parts of (a), the amount of (b) present ranges from about 5 to about 150 parts and the amount of (c) ranges from about 0.05 to about 10 parts by weight.

8. A composition according to claim 1 wherein (a) is a butadiene/styrene copolymer and (b) is a precipitated hydrated silica.

9. A composition according to claim 1 wherein (a) is a butadiene/styrene copolymer, (b) is silica and (c) is 3-(trimethoxysilyl)propylsulfenyl dimethyldithiocarbamate, methyl 3-(trimethoxysilyl)propylsulfenate, or ethyl 3-(trimethoxysilyl)propylsulfenate.

10. A composition according to claim 9 including sulfur, a cure accelerator, processing aids and light and ozone stabilizers.

11. A compound suitable for use as coupling agents or promoters in the silica filler reinforcement of a rubber represented by the formula

wherein R' is a hydrocarbon radical of 1 to 10, inclusive, carbon atoms, R, R" and R''' are selected from R' and hydrogen, R" and R''' can be linked together and form with the nitrogen atom a cyclic structure, Q is alkylene, cycloalkylene, arylene, or combinations thereof having from 1 to about 10, inclusive, carbon atoms, and n is 0, 1, or 2.

12. A compound according to claim 11 which is 3-(trimethoxysilyl)propylsulfenyl dimethyldithiocarbamate.

13. A process for enhancing the effectiveness of silica-containing materials as reinforcing fillers in vulcanizable rubber compositions which comprises effectively bonding said silica-containing material to the rubber by incorporating therein a reinforcing amount of at least one compound of claim 11 and curing the resulting composition.

14. A process according to claim 3 wherein said promoting amount ranges from about 0.05 to about 10 parts by weight per hundred parts by weight of rubber.

15. A process according to claim 14 wherein said promoting agent is 3-(trimethoxysilyl)propylsulfenyl dithiocarbamate.

16. A process for producing a compound as defined in claim 11 which comprises allowing a (mercaptoalkyl)-trihydrocarbyloxysilane to react with a chlorinating agent and then allowing the resulting product to react with the product resulting from the reaction of carbon disulfide and a dihydrocarbyl or cyclic secondary amine under ambient conditions and in an inert atmosphere.

* * * * *